United States Patent
Lee et al.

(10) Patent No.: US 8,125,604 B2
(45) Date of Patent: Feb. 28, 2012

(54) LIQUID CRYSTAL DISPLAY DEVICE

(75) Inventors: Seong-young Lee, Anyang-si (KR);
Sahng-ik Jun, Yongin-si (KR);
Dong-gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1154 days.

(21) Appl. No.: 11/933,084

(22) Filed: Oct. 31, 2007

(65) Prior Publication Data

US 2008/0266230 A1    Oct. 30, 2008

(30) Foreign Application Priority Data

Jan. 11, 2007    (KR) .................. 10-2007-0003515

(51) Int. Cl.
*G02F 1/1343* (2006.01)
(52) U.S. Cl. .................... 349/144; 349/145; 349/146
(58) Field of Classification Search .............. 349/48, 349/144
See application file for complete search history.

(56) References Cited

U.S. PATENT DOCUMENTS

| | | | | |
|---|---|---|---|---|
| 5,870,075 | A * | 2/1999 | Yamazaki et al. | 345/92 |
| 7,760,311 | B2 * | 7/2010 | Chung et al. | 349/144 |
| 7,834,949 | B2 * | 11/2010 | Tasaka et al. | 349/48 |
| 2004/0150781 | A1 * | 8/2004 | Lim | 349/151 |
| 2006/0274009 | A1 * | 12/2006 | Lee | 345/92 |
| 2007/0052902 | A1 * | 3/2007 | Yoo et al. | 349/144 |
| 2007/0235735 | A1 * | 10/2007 | Kim et al. | 257/59 |
| 2008/0204613 | A1 * | 8/2008 | Kim et al. | 349/33 |

* cited by examiner

*Primary Examiner* — Wen-Ying P Chen
(74) *Attorney, Agent, or Firm* — Innovation Counsel LLP

(57) ABSTRACT

A liquid crystal display device includes a first substrate; a second substrate which faces the first substrate and comprises a common electrode; and a liquid crystal layer located between the first and second substrates, the first substrate comprises: a data line and a gate line which cross each other; and a pixel electrode which is bent at least once and comprises a first sub-pixel electrode and a second sub-pixel electrode which are separated from each other, the first sub-pixel electrode is extended along the direction of the data line, the second sub-pixel electrode comprises a first part located on the right side of the first sub-pixel electrode and a second part located on the left side of the first sub-pixel electrode, and the data line comprises a first data line passing through the first part and a second data line passing through the second part.

23 Claims, 14 Drawing Sheets

LIQUID CRYSTAL DISPLAY DEVICE

CROSS-REFERENCE TO RELATED APPLICATION

This application claims the benefit of Korean Patent Application No. 10-2007-0003515, filed on Jan. 11, 2007, in the Korean Intellectual Property Office, the disclosure of which is incorporated herein by reference.

BACKGROUND OF THE INVENTION

1. Field of the Invention

The present invention relates to a liquid crystal display device and, more particularly, to a liquid crystal display device having better visibility through an improved pixel electrode.

2. Description of the Related Art

A liquid crystal display device includes a first substrate in which a thin film transistor is formed, a second substrate aligned in opposition to the first substrate, and a liquid crystal layer between the first and second substrates. A vertically aligned (VA) mode liquid crystal display device offers an improved viewing angle through the use of a domain division part formed on a pixel electrode and a common electrode. Fringe fields formed by the domain division part are used to control the direction that liquid crystal molecules take so that the viewing angle is improved.

In a conventional vertically aligned (VA) mode device, a shield electrode using a transparent conductive material is formed in the upper portion of a data line to prevent coupling capacitance between the pixel electrode and the data line. The pixel electrode and the shield electrode should be spaced apart because they are formed in same layer. Accordingly, the area of the pixel electrode is decreased which lowers the aperture ratio of the liquid crystal display device.

SUMMARY OF THE INVENTION

According to an aspect of the present invention, a liquid crystal display device having an improved aperture ratio comprises: a pixel electrode bent at least once having a first sub-pixel electrode and a second sub-pixel electrode separated from each other, the first sub-pixel extending in the direction of a data line, the second sub-pixel electrode having portions located to the right and left of the first sub-pixel electrode, wherein the data line passes alternately through respective parts of the sub-pixel electrodes.

A liquid crystal display device comprising: a first substrate having a data line and a gate line which cross each other; and a plurality of pixel electrodes each of which is bent at least once and each of which includes a first sub-pixel electrode extended along the direction of the data line, each pixel electrode including a second sub-pixel electrode having a first part located on the right side of the first sub-pixel electrode and a second part located on the left side of the first sub-pixel electrode, the data line alternately passing through first and second ones of the sub-pixel electrodes.

According to an aspect of the invention, the first substrate further comprises a thin film transistor which is electrically connected with the pixel electrode, and the thin film transistor comprises: a first thin film transistor which is electrically connected with one of the first data line and the second data line and the first sub-pixel electrode; and a second thin film transistor which is electrically connected with the other of the first data line and the second data line and the second sub-pixel electrode.

According to an aspect of the invention, a data voltage which is applied to the first sub-pixel electrode is higher than a data voltage which is applied to the second sub-pixel electrode.

According to an aspect of the invention, the liquid crystal display device is driven at a frequency of 120 Hz.

According to an aspect of the invention, the data line and the first sub-pixel electrode are spaced from each other.

According to an aspect of the invention, the data line is bent along an edge of the pixel electrode.

According to an aspect of the invention, the first substrate further comprises an organic film located between the data line and the pixel electrode.

According to an aspect of the invention, the second sub-pixel electrode surrounds the first sub-pixel electrode.

According to an aspect of the invention, the first sub-pixel electrode has a crooked shape and the second sub-pixel electrode further comprises: a third part which is formed on the upper part of the first sub-pixel electrode; and a fourth part which is formed on the upper part of the first sub-pixel electrode.

According to an aspect of the invention, the pixel electrode is bent three times along the direction of the data line.

According to an aspect of the invention, the first sub-pixel electrode and the pixel electrode are bent three times along the direction of the data line.

According to an aspect of the invention, the first sub-pixel electrode and the pixel electrode has a crooked shape.

According to an aspect of the invention, a pixel electrode excision pattern is formed on the pixel electrode, and a domain division part is formed in the common electrode, and the liquid crystal layer is formed in a vertical alignment mode.

According to an aspect of the invention, a part of the domain division part in the common electrode is extended while overlapping the data line.

The foregoing and/or other aspects of the present invention are achieved by providing a liquid crystal display device comprising; an insulation substrate; a data line and a gate line which are formed on the insulation substrate and cross each other; a passivation film which is formed on the data line and the gate line; and a pixel electrode which is formed on the passivation film, comprises a first sub-pixel electrode and a second sub-pixel electrode which are separated from each other and are electrically connected with the different data lines, and is bent at least once along the direction of the data line, the second sub-pixel electrode overlaps the data line.

According to an aspect of the invention, a data voltage which is applied to the first sub-pixel electrode is higher than a data voltage which is applied to the second sub-pixel electrode.

According to an aspect of the invention, the data line is bent along an edge of the pixel electrode.

According to an aspect of the invention, the first substrate further comprises an organic film located between the data line and the pixel electrode.

According to an aspect of the invention, the second sub-pixel electrode surrounds the first sub-pixel electrode.

According to an aspect of the invention, the liquid crystal display device is driven at a frequency of 120 Hz.

According to an aspect of the invention, the first sub-pixel electrode has a crooked shape.

According to an aspect of the invention, the pixel electrode is bent three times along the direction of the data line.

According to an aspect of the invention, the data line comprises: a first data line which is electrically connected with the first sub-pixel electrode; and a second data line which is electrically connected with the second sub-pixel electrode, the first sub-pixel electrode being located between the first data line and the second data line.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE INVENTION

Hereinafter, where a film (or layer) is formed (or located) on the "upper portion" of another film (or layer) it should be understood that a third film (or layer) may exist between two films (or layers) and/or that two films (or layers) may abut each other.

Figure 1:
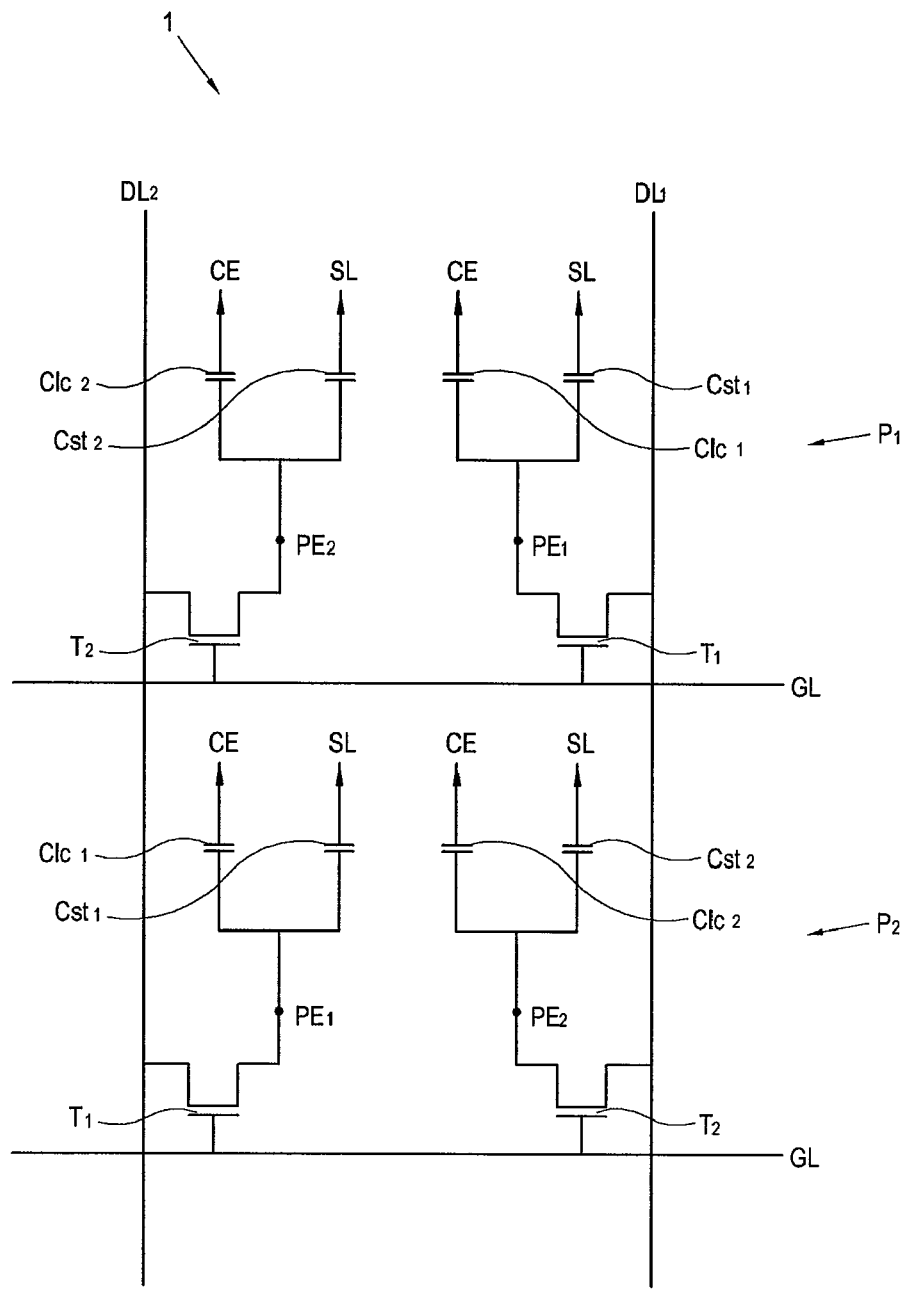
FIG. 1 is an equivalent circuit diagram showing a liquid crystal display device according to the present invention.

FIG. 1 is an equivalent circuit diagram showing a liquid crystal display device according to a first exemplary embodiment of the present invention. In FIG. 1, two adjacent pixels P1 and P2 in the extended direction of the data lines DL1 and DL2 are shown. Each pixel P1, P2 is connected to a respective gate line GL and each pixel is connected to both data lines DL1 and DL2 and each pixel includes two thin film transistors T1, T2.

In the upper pixel P1, a first thin film transistor T1 is connected with a first data line DL1 and a gate line GL, and a second thin film transistor T2 is connected with a second data line DL2 and a gate line GL.

The thin film transistors T1 and T2 are connected to the same gate line GL and are simultaneously driven. The thin film transistors T1 and T2 are connected to different data lines DL1 and DL 2, respectively, and thus output different signals.

Liquid crystal capacitors $C_{lc1}$ and $C_{lc2}$ and storage capacitors $C_{sta}$ and $C_{st2}$ are connected with a respective one of thin film transistor T1 or T2. The liquid crystal capacitors $C_{lc1}$ and $C_{lc2}$ are formed between pixel electrodes PE1 and PE2 and a common electrode CE, and the sustenance capacitors $C_{lc1}$, and $C_{lc2}$ are formed between the pixel electrodes PE1 and PE 2 and a storage electrode line SL.

The first sub-pixel electrode PE1 and the second sub-pixel electrode PE2 are separated from each other.

The lower pixel P2 has a structure similar to that of the upper pixel P1. The first thin film transistor T1 which is connected with the first data line DL1 is connected with the second sub-pixel electrode PE2 and the second thin film transistor T2 which is connected with the second data line DL2 is connected with the first sub-pixel electrode PE1.

That is, the data lines DL1 and DL2 each apply their data voltages to alternate ones of the sub-pixel electrodes PE1 and PE2.

Visibility is improved in a liquid crystal display device according to the present invention, as will be described taking an upper pixel P1 as an example.

A first data voltage is applied to the first pixel electrode PE1 through the first thin film transistor T1, and a second data voltage different from the first data voltage is applied to the second pixel electrode PE2 through the second thin film transistor T2. That is, two domains in which respectively different data voltages are applied are formed within a single pixel.

Figure 2:
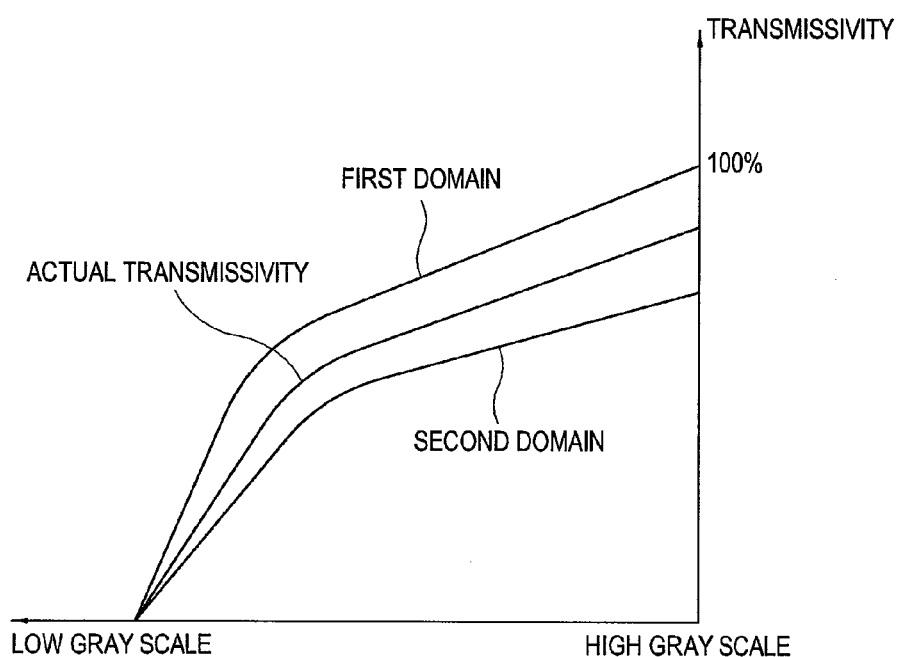
FIG. 2 is a view illustrating a principle of improving a visibility of the liquid crystal display device according to the present invention.

As shown in FIG. 2, a high domain having a high brightness is formed in correspondence to the first sub-pixel electrode PE1 and a low domain having a low brightness is formed in correspondence to the second sub-pixel electrode PE2.

Accordingly, a plurality of domains having respectively different gamma curves exists within a pixel. The brightness and colors of the front and lateral sides are compensated to each other to thereby improve a lateral visibility.

Figure 5:
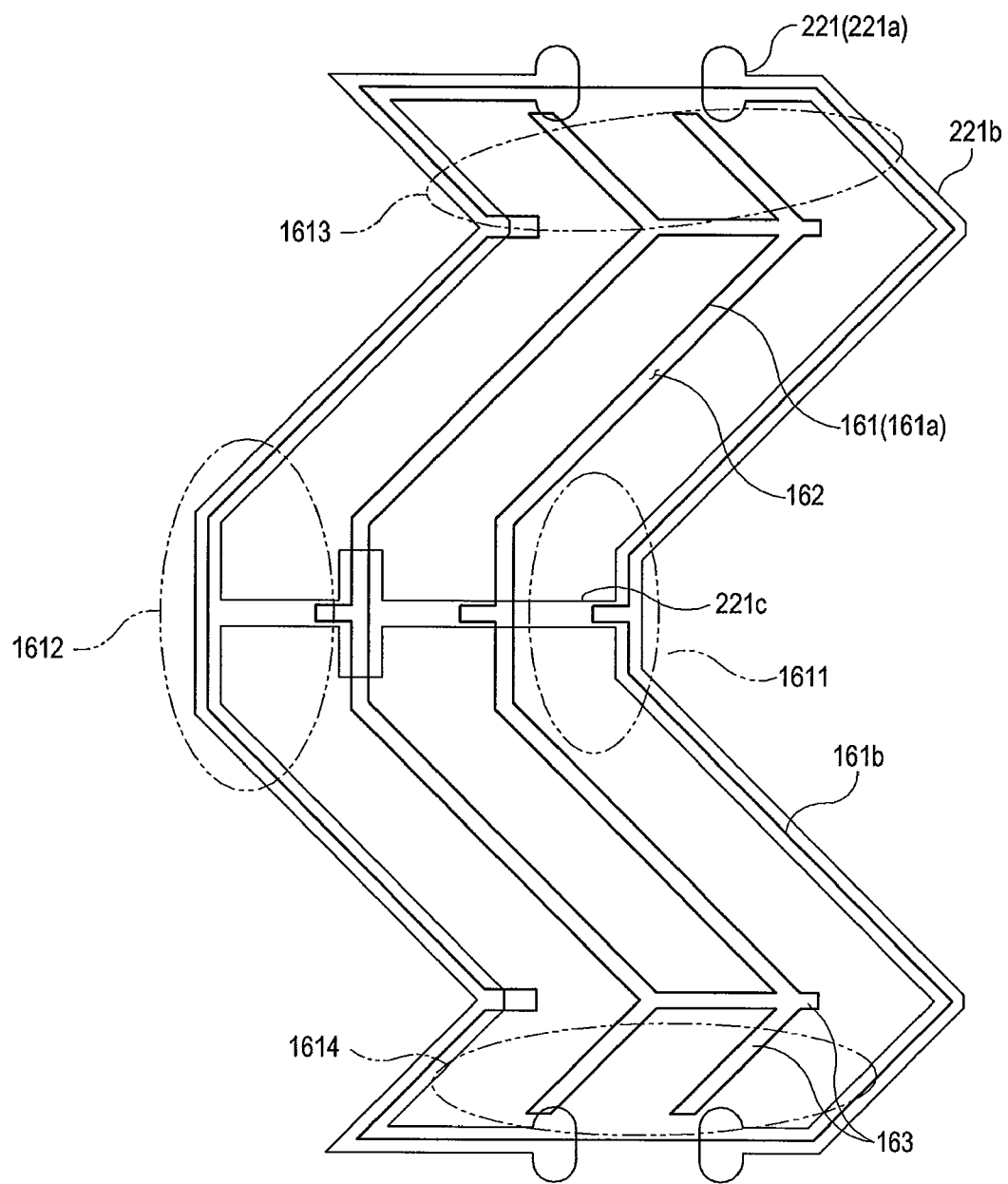
Figure 6:
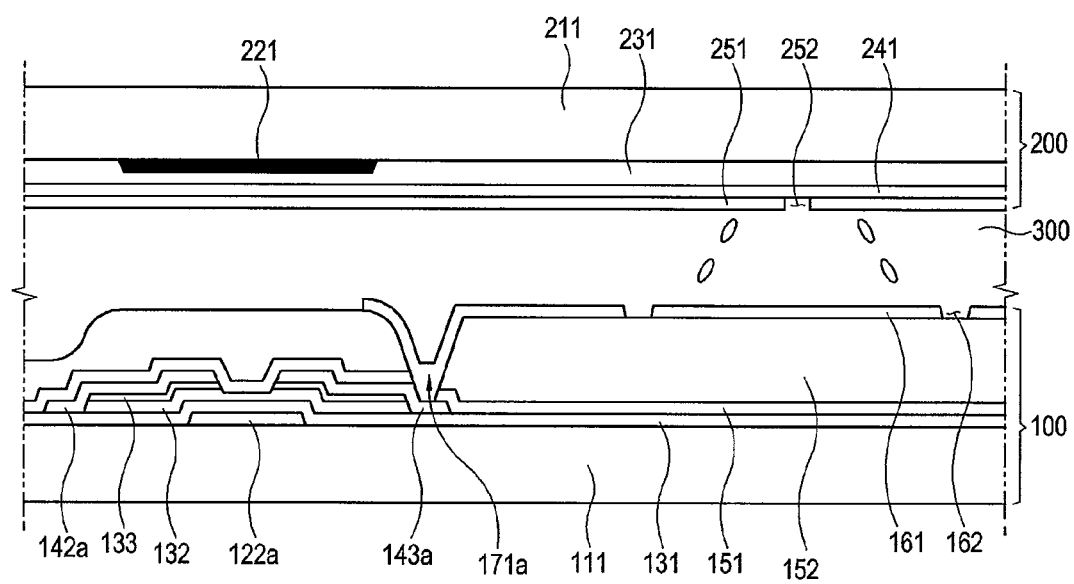
FIG. 6 is a cross-sectional view, taken along a line VI-VI of FIG. 3.
Figure 7:
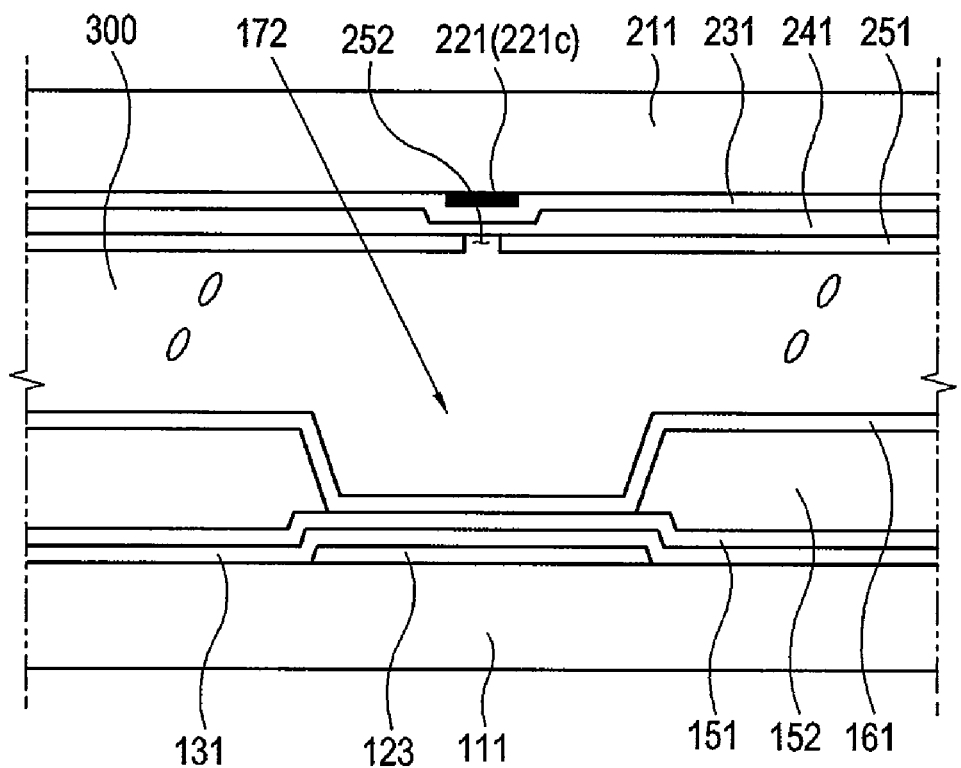
FIG. 7 is a cross-sectional view, taken along a line VII-VII of FIG. 3.
Figure 8:
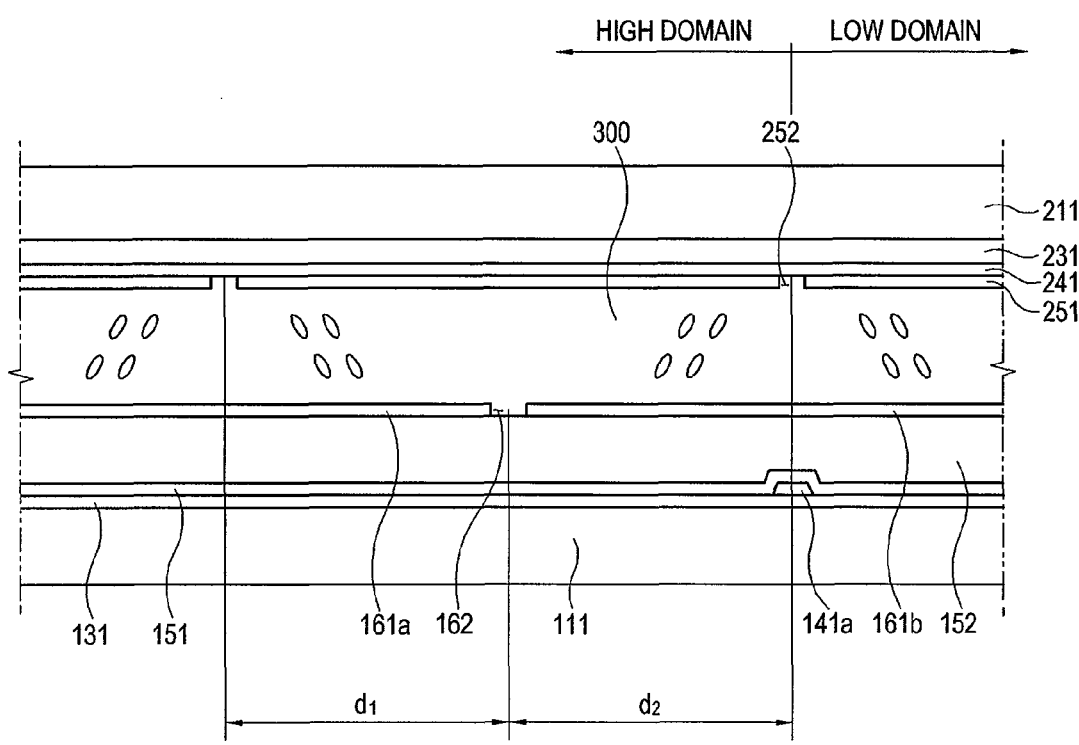
FIG. 8 is a cross-sectional view, taken along a line VIII-VIII of FIG. 3.

The liquid crystal display device according to the first exemplary embodiment of the present invention will be described with reference to FIGS. 3 through 8. Referring to FIGS. 6 through 8, in particular, referring to FIG. 6, the liquid crystal display device 1 includes a first substrate 100, a second substrate 200 which is formed in opposition to the first substrate 100, and a liquid crystal layer 300 located between both the first and second substrates 100 and 200.

Figure 4:
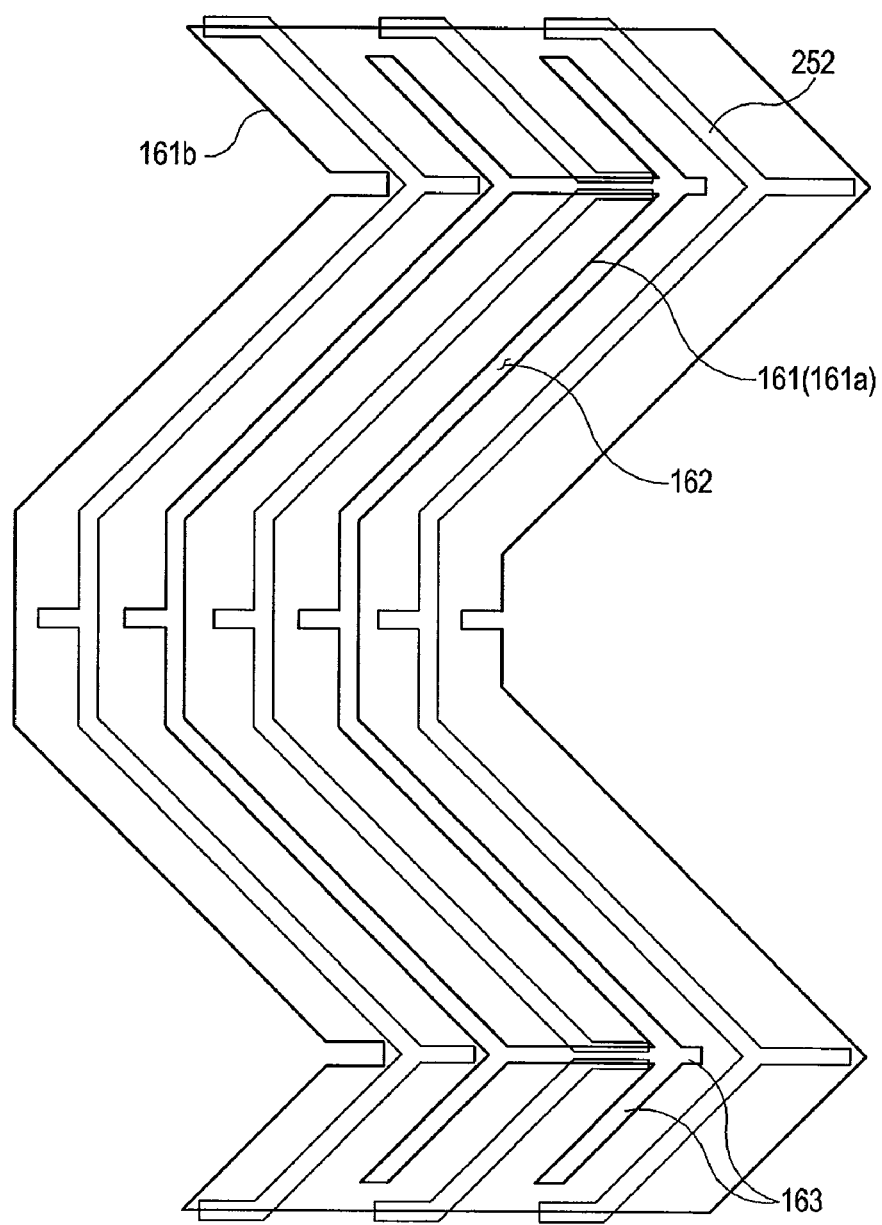

FIG. 4 illustrates the layout relationship between a pixel electrode 161 of the first substrate 100 and a common electrode excision pattern 252 of the second substrate 200. FIG. 5 illustrates a layout relationship between the pixel electrode 161 of the first substrate 100 and a black matrix 221 of the second substrate 200.

First, the first substrate 100 will be described below with reference to FIGS. 3 and 6.

A gate wiring is formed on a first insulation substrate 111. The gate wiring may be a metal single layer or a metal multilayer. The gate wiring includes a gate line 121 which is transversely extended, gate electrodes 122a and 122b which are connected with the gate line 121, and a storage capacitor line 123 which is extended in parallel with the gate line 121 and passes through the central part of the pixel.

A gate insulating film 131 including silicon nitride (SiNx) etc., covers the gate wiring on the first insulation substrate 111.

A semiconductor layer 132 including a semiconductor material of amorphous silicon etc., is formed on the upper portion of the gate insulating film 131 of the gate electrodes 122a and 122b. An ohmic contact layer 133, which is made of silicide or n⁺ hydrogenated amorphous silicon etc., doped with n type impurities at high concentration, is formed on the upper portion of the semiconductor layer 132. The ohmic contact layer 133 has been removed from a channel portion between a source electrode 142 and a drain electrode 143.

A data wiring is formed on the ohmic contact layer 133 and the gate insulating film 131. The data wiring may be also of a metal single layer or a metal multiplayer. The data wiring includes: a data line 141 which is longitudinally formed and crosses the gate line 121 to thereby form a pixel; a source electrode 142 which is a branch of the data line 141 and partly extended to the upper portion of the ohmic contact layer 133; and a drain electrode 143 which is separated from the source electrode 142, and is partly extended to the upper portion of the ohmic contact layer 133 which is located in opposition to the source electrode 142.

Figure 3:
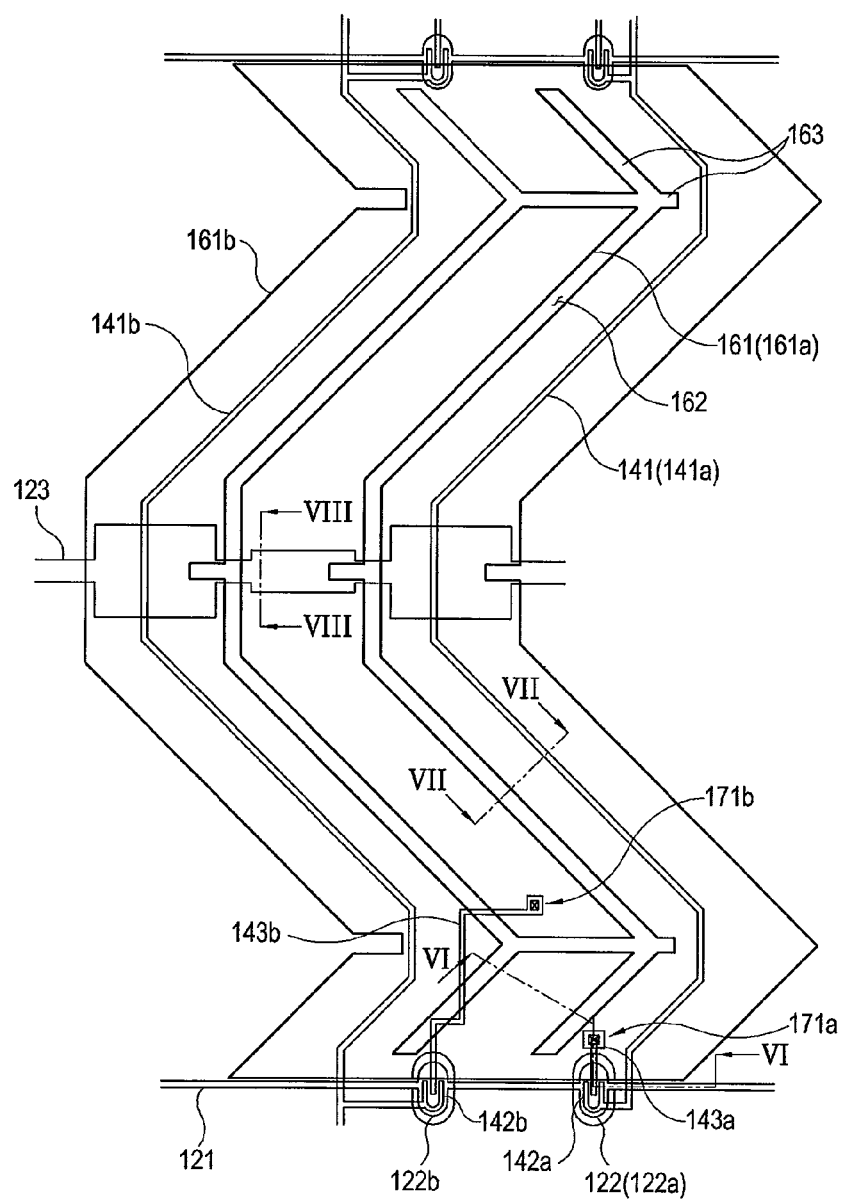
FIGS. 3 to 5 are an arrangement plan view showing a liquid crystal display device according to a first exemplary embodiment of the present invention.

Referring to FIG. 3, the first thin film transistor T1 includes a gate electrode 122a, a source electrode 142a, and a drain electrode 143a, and the second thin film transistor T2 includes a gate electrode 122b, a source electrode 142b, and a drain electrode 143b.

The data line 141 includes a first data line 141a and a second data line 141b. The first thin film transistor T1 is connected with the first data line 141 which passes through the right side of the pixel, and the second thin film transistor T2 is connected with the second data line 141b which passes through the left side of the pixel.

A passivation film 151 made of silicon nitride etc., is formed on the data wiring and the semiconductor layer 132 which is not covered by the data wiring. The passivation film 151 may be formed of an inorganic material such as silicon nitride, or formed of an organic material. Further, the passivation film 151 may be formed of a double layer comprising a first film made of the organic material and a second film made of the inorganic material.

An organic film 152 is formed on the passivation film 151. Organic film 152 is thicker than gate insulating film 131 and passivation film 151 and may be formed using spin coating, slit coating, screen printing, etc. The organic film 152 may comprise one of BCB (benzocyclobutene) series, olefin series, acrylic resin series, polyimidepolyimide series, fluororesin, etc.

Contact holes 171a and 171b, which expose the drain electrodes 143a and 143b and an opening 172 (see FIG. 7) that corresponds to the storage capacitor line 123 and exposes the passivation film 151, are formed in the organic film 152. The passivation film 151 is also removed from the contact holes 171a and 171b.

In the other exemplary embodiments of the present invention, the organic film 152 can be omitted.

Referring to FIG. 7, a pixel electrode 161 is located closely to storage capacitor line 123 through the opening 172 and an organic film 152 does not exist between the pixel electrode 161 and the storage capacitor line 123. A storage capacitor Cst is formed between the pixel electrode 161 to which a pixel voltage is applied and the storage capacitor line 123 to which a common voltage is applied.

Opening 172 is provided on the storage capacitor line 123 to remove the organic film 152 which, because it is relatively thick and has low permittivity, tends to make difficult the forming of a storage capacitor between the pixel electrode 161 and the storage capacitor line 123.

Referring back to FIGS. 3 and 6, the pixel electrode 161 is formed on the organic film 152. The pixel electrode 161 is made of a transparent conductive material such as ITO (indium tin oxide) and IZO (indium zinc oxide). The pixel electrode 161 is extended along the direction of the data line 141, and is bent three times.

The pixel electrode 161 includes a first sub-pixel electrode 161a and a second sub-pixel electrode 161b which are separated from each other by a pixel electrode separation pattern 162. The first sub-pixel electrode 161a is crooked in shape and is located at the center of the pixel. The second sub-pixel electrode 161b surrounds the first sub-pixel electrode 161a.

The second sub-pixel electrode 161b has a wider area than the first sub-pixel electrode 161a. The storage capacitor line 123 overlaps more of the second sub-pixel electrode 161b than the first sub-pixel electrode 161a because the domain corresponding to the second sub-pixel electrode 161b, which has wide area, needs a larger storage capacitor Cst.

Referring to FIG. 5, the second sub-pixel electrode 161b includes: a first part 1611 which is located on the right side of the first sub-pixel electrode 161a; a second part 1612 which is located on the left side of the first sub-pixel electrode 161a; a third part 1613 which is located on the upper side of the first sub-pixel electrode 161a; and a fourth part 1614 which is located on the lower side of the first sub-pixel electrode 161a.

Referring back to FIGS. 3 and 6, a pixel electrode excision pattern 163 is formed on the first sub-pixel electrode 161a and the second sub-pixel electrode 161b. A part of the pixel electrode excision pattern 163 is in parallel with the pixel electrode separation pattern 162, and the other parts thereof are in parallel with the gate line 121.

The first sub-pixel electrode 161a is connected with a drain electrode 143b of the second thin film transistor T2 through the contact hole 171b, and the second sub-pixel electrode 161b is connected with a drain electrode 143a of the first thin film transistor T1 through the contact hole 171a.

The pixel electrode separation pattern 162 and the pixel electrode excision pattern 163 divide a liquid crystal layer 300 together with a common electrode excision pattern 252, to be described later, into a number of sub-domains. The sub-domain in the present invention refers to an area surrounded by excision patterns 162, 163 and 252 that extend lengthwise in an oblique direction.

The second substrate 200 will be described below with reference to FIG. 6.

A black matrix 221 is formed on the second insulation substrate 211. The black matrix 221 may be formed of a photoresist organic material in which a black pigment is added. Carbon black, titanium oxide, etc., is used as the black pigment.

Referring to FIG. 5, the black matrix 221 includes: a first part 221a formed over the thin film transistors T1 and T2; a second part 221b formed along the edge of the pixel; and a third part 221c formed over the storage capacitor line 123.

Referring back to FIG. 6, a color filter 231 is formed on the second insulation substrate 211 and the black matrix 221. The color filter 231 may include sub-layers of respectively different colors, for example, red, green, and blue.

An overcoat film 241 is formed on the color filter 231. The overcoat film 241 provides a planar surface. The overcoat film 241 can be omitted.

A common electrode 251 is formed on the upper portion of the overcoat film 241. The common electrode 251 is made of a transparent conductive material such as ITO (indium tin oxide) and IZO (indium zinc oxide). The common electrode 251 applies a voltage directly to the liquid crystal layer 300 together with the pixel electrode 161 of the first substrate 100.

The common electrode excision pattern 252 is formed on the common electrode 251. As shown in FIG. 4, a part of the common electrode excision pattern 252 is extended in parallel with the pixel electrode separation pattern 162, and the other parts thereof are extended in parallel with the gate line 121.

The common electrode excision pattern 252 is also called as a domain division part. Protrusions can be used as the domain division part in another exemplary embodiment, in which case the common electrode 251 may not be patterned.

An area which is surrounded by the excision patterns 162, 163 and 252 is sub-domain. Referring to FIGS. 4 and 5, the first sub-pixel electrode 161a, the first part 1611 and the second part 1612 are divided into four sub-domains, respectively, and the third part 1613 and the fourth part 1614 are divided into six sub-domains, respectively. Each sub-domain is extended lengthwise in an oblique direction with respect to the gate line 121.

The patterns 162, 163 and 252 are not limited to the exemplary embodiments, but may be formed in various shapes.

Referring to FIG. 8, a liquid crystal layer 300 is located between a first substrate 100 and a second substrate 200. The liquid crystal layer 300 has a vertically aligned (VA) mode, and a long axis of liquid crystal molecules aligns to be vertical, at the state where a voltage is not applied.

If an electric field is applied to the liquid crystal molecules, they become oriented vertically with respect to the electrical field because the crystals have negative permittivity anisotropy. In the absence of the excision patterns 162, 163 and 252, the liquid crystal molecules are arranged anarchically or disorderly in different directions because the orientation direction of the liquid crystal molecules is not determined, and a disclination line occurs on the boundary between different orientation directions.

The excision patterns 162, 163 and 252 make a fringe field when a voltage is applied to the liquid crystal layer 300 and determine the orientation directions of the liquid crystal molecules. The above-described liquid crystal display device 1 has an excellent aperture ratio, which will be described with reference to FIGS. 3 and 8.

Data line 141 is not located outside of the pixel electrode 161, but is formed to overlap pixel electrode 161 and, more particularly, data line 141 is formed to overlap the second sub-pixel electrode 161b of pixel electrode 161.

Further, the first data line 141a passes through the third part 1613, the first part 1611 and the fourth part 1614, and the second data line 141b passes through the third part 1613, the second part 1612 and the fourth part 1614 of pixel electrode 161.

Data line 141 is bent along the edge of the pixel electrode 161. The first data line 141a and the second data line 141b face each other and the first sub-pixel electrode 161a is interposed between the first data line 141a and the second data line 141b.

According to an aspect of the present invention, since the data line 141 is located within the pixel electrode 161, a shield electrode need not be formed, thus improving the aperture ratio.

A large portion of data line 141 overlaps the common electrode excision pattern 252 which does not contribute to the aperture ratio. Accordingly, although data line 141 is formed within the area of the pixel electrode 161, the decrease in an aperture ratio due to data line 141 is negligible.

However, since data line 141 overlaps the pixel electrode 161, an electrical interference such as a crosstalk may occur.

Different data voltages are applied to the first sub-pixel electrode 161a and the second sub-pixel electrode 161b. The data voltage which is applied to the second sub-pixel electrode 161b covering the data line 141 is lower than the data voltage which is applied to the first sub-pixel electrode 161a. That is, the first sub-pixel electrode 161a becomes a high domain whose brightness is high, and the second sub-pixel electrode 161b becomes a low domain whose brightness is low.

A low data voltage means that the difference between the data voltage and the common voltage is small. On the contrary, a high data voltage means that the difference between the data voltage and the common voltage is large.

Data line 141 does not overlap the first sub-pixel electrode 161a whose data voltage is high but overlaps the second sub-pixel electrode 161b whose data voltage is low. Therefore, formation of a capacitance between the data line 141 and the pixel electrode 161 is suppressed, thus there is not much crosstalk between data line 141 and the pixel electrode 161.

The organic film 152 which is formed between the data line 141 and the first sub-pixel electrode 161a also decreases the electrical interference therebetween. Since the organic film 152 has small permittivity and a large thickness, the capacitance formed between the data line 141 and the second sub-pixel electrode 161b is lessened.

The liquid crystal display device according to the first exemplary embodiment, can be driven at a frequency of 60 Hz or higher, for example, at a frequency of 120 Hz through 180 Hz. The frequency means the number of times at which each gate line 121 is driven for one second, that is, the number of times at which a gate-on voltage is applied to each gate line 121 is driven for one second.

A higher frequency improves display quality. However, this may increase electrical interference between the pixel electrode 161 and the data line 141 which may adversely affect display quality.

According to the first exemplary embodiment, the data line 141 overlaps the second sub-pixel electrode 161b and electrical interference between the data line 141 and the second sub-pixel electrode 161b is not large, as described above. Accordingly, even if the frequency increases, affect on the quality of the display is minimized.

Next, each sub-domain will be described with reference to FIG. 8.

Referring to FIG. 8, the width d1 of a sub-domain belonging to a high domain and the width d2 of a sub-domain belonging to a low domain are almost same. It is preferable but not necessarily that width d1 or d2 of each sub-domain is 20 μm through 25 μm.

If width d1 or d2 of each sub-domain is smaller than 20 μm, the aperture ratio decreases and, if width d1 or d2 of each sub-domain is larger than 25 μm, the response speed of the liquid crystal layer 300 located at the center of the sub-domains decreases.

The width d1 or d2 of each sub-domain is determined according to the resolution and size of the liquid crystal display device 1. Where the liquid crystal display device 1 is about 70 inches in size and has a resolution of 1080*1920, the width d1 or d2 of each sub-domain may be 20 μm to 25 μm.

Figure 9:
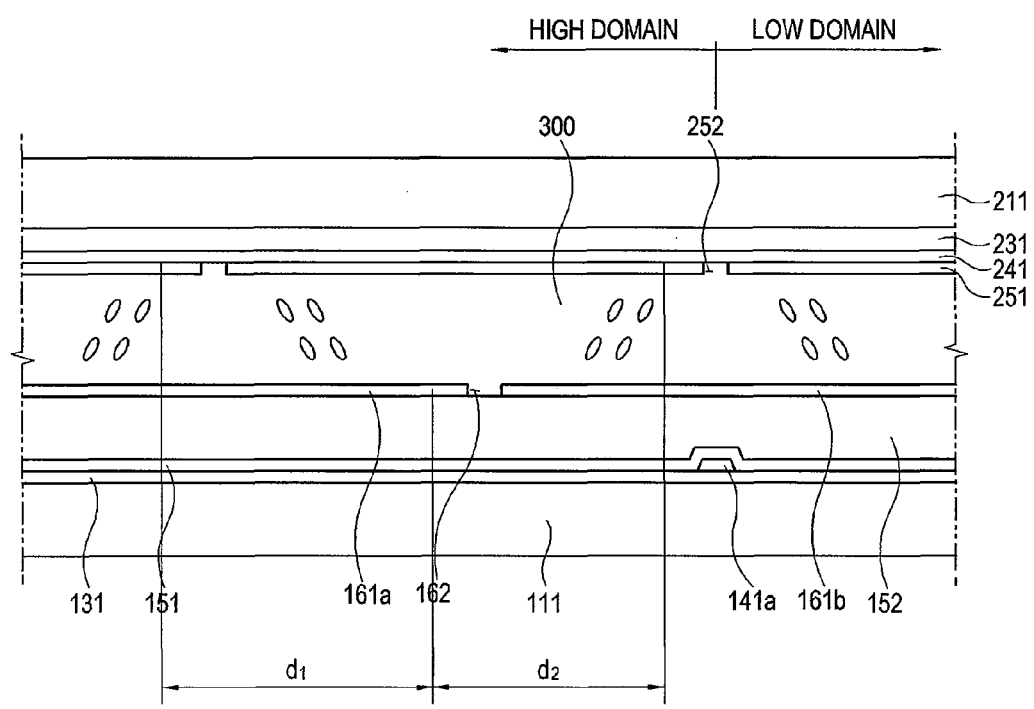
FIG. 9 is a cross-sectional view showing a liquid crystal display device according to a second exemplary embodiment of the present invention.

Referring to FIG. 9, a liquid crystal display device according to a second exemplary embodiment of the present invention will be described below.

The width d1 of a sub-domain belonging to a high domain is larger than the width d2 of a sub-domain belonging to a low domain in the second exemplary embodiment. For example, the width d1 of a sub-domain belonging to a high domain may be about 24.4 μm while the width d2 of a sub-domain belonging to a low domain may be about 21.5 μm.

Figure 10:
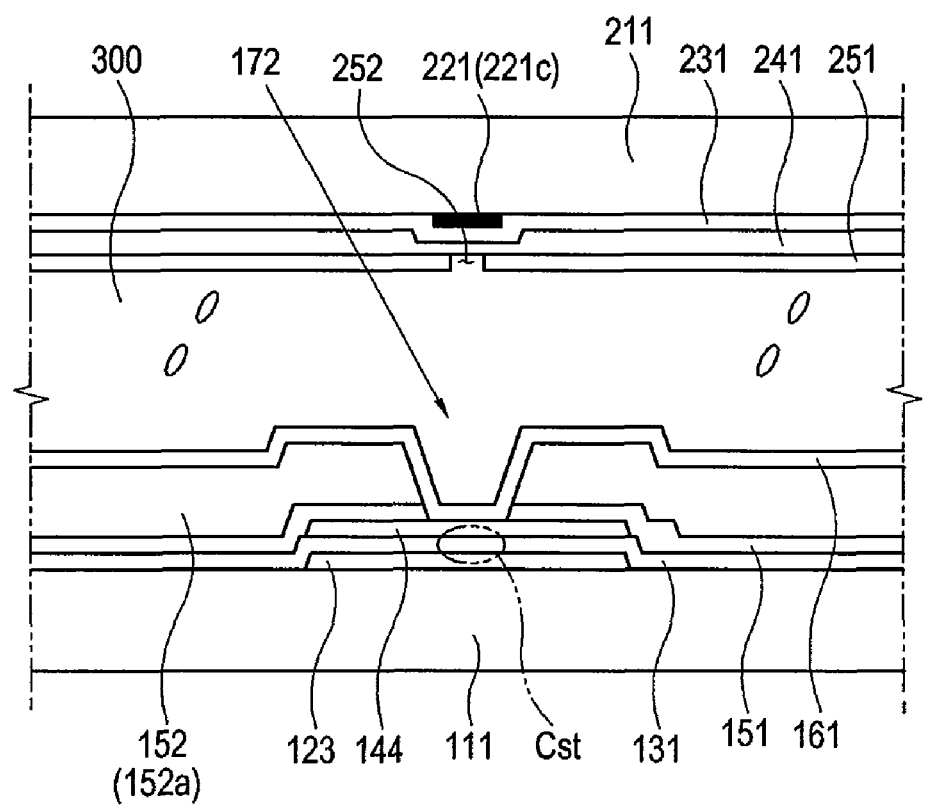
FIG. 10 is a cross-sectional view showing a liquid crystal display device according to a third exemplary embodiment of the present invention.

Referring to FIG. 10, a liquid crystal display device according to a third exemplary embodiment of the present invention will be described below.

A storage capacitor auxiliary layer 144 is formed on a storage capacitor line 123 in the third exemplary embodiment. The storage capacitor auxiliary layer 144 can be formed of the same layer as the data line 141.

The storage capacitor auxiliary layer 144 is electrically connected with the pixel electrode 161 through an opening 172. A passivation film 151 and an organic film 152 have been removed from the opening 172.

The storage capacitor line 123 and the storage capacitor auxiliary layer 144 face each other, gate insulator film 131 being interposed between the storage capacitor line 123 and the storage capacitor auxiliary layer 144.

In the third exemplary embodiment, storage capacitor Cst includes gate insulator film 131 disposed between the storage capacitor auxiliary layer 144 to which the data voltage is applied and the storage capacitor line 123 which is connected to the common voltage through the pixel electrode 161.

Figure 11:
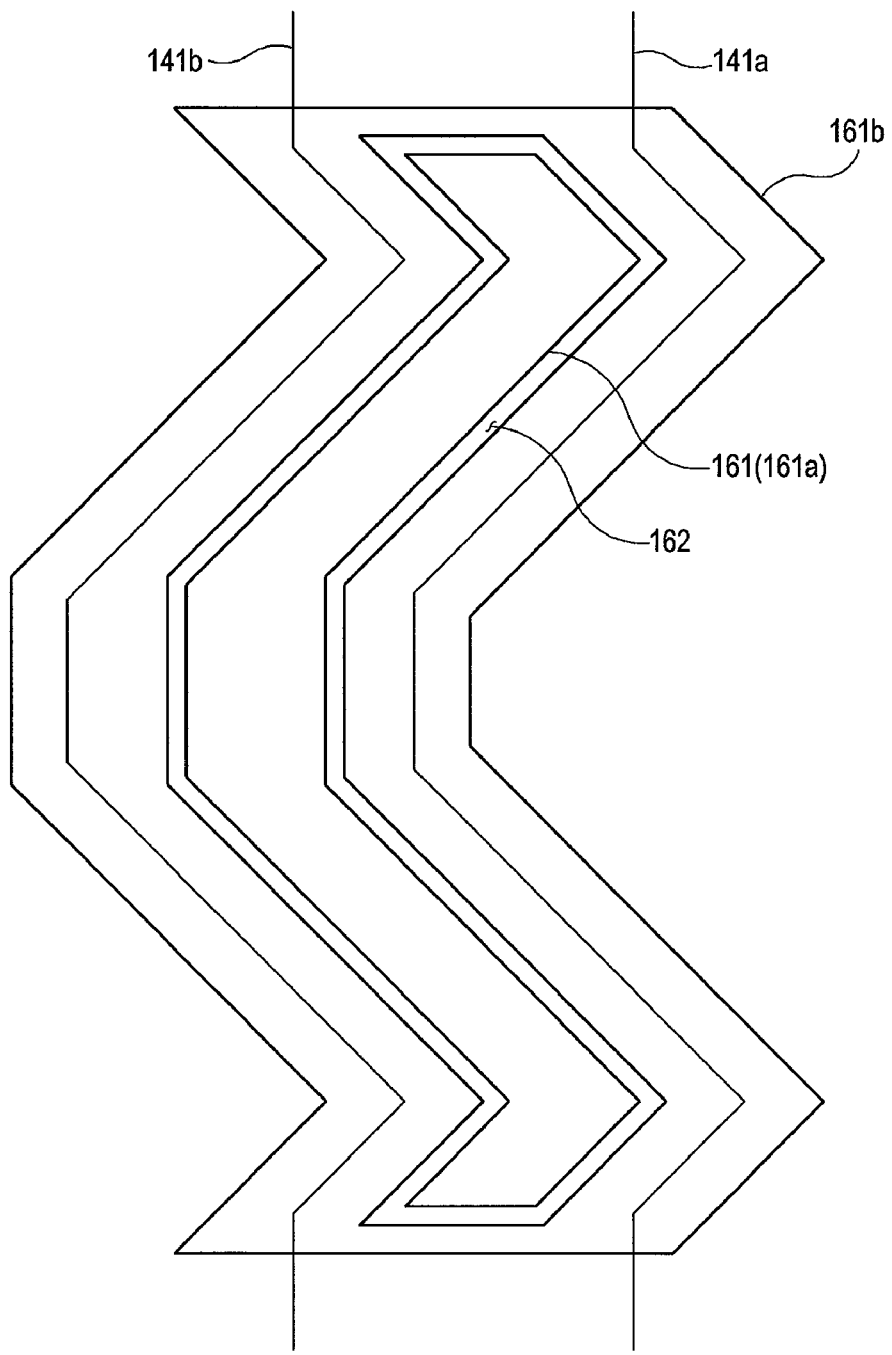
FIG. 11 is an arrangement plan view showing a liquid crystal display device according to a fourth exemplary embodiment of the present invention.

Referring to FIG. 11, a liquid crystal display device according to a fourth exemplary embodiment of the present invention will be described below.

A pixel electrode 161 is extended lengthwise along the direction of a data line 141, and is bent three times.

The first sub-pixel electrode 161a is also extended lengthwise along the direction of the data line 141, and is also bent three times. The second sub-pixel electrode 161b surrounds the first sub-pixel electrode 161a.

The data line 141 passes through the second sub-pixel electrode 161b to which a low data voltage is applied.

Figure 12:
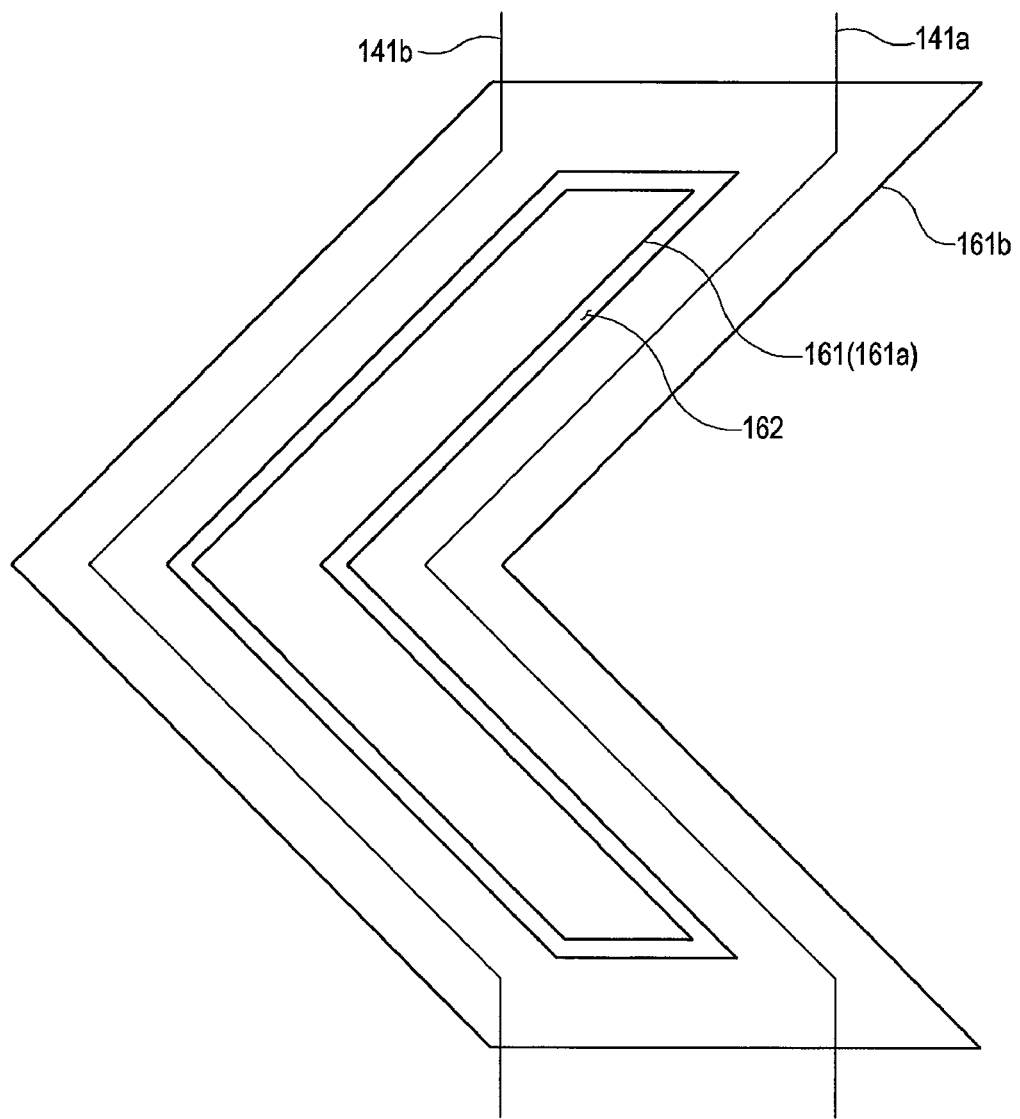
FIG. 12 is an arrangement plan view showing a liquid crystal display device according to a fifth exemplary embodiment of the present invention.

Referring to FIG. 12, a liquid crystal display device according to a fifth exemplary embodiment of the present invention will be described below.

A pixel electrode 161 is extended lengthwise along the direction of data line 141, and is has a crooked shape that is bent once.

A first sub-pixel electrode 161a is also extended lengthwise along the direction of the data line 141, and has a crooked shape that is bent once, too. A second sub-pixel electrode 161b surrounds the first sub-pixel electrode 161a.

The data line 141 passes through the second sub-pixel electrode 161b to which a low data voltage is applied.

In the above-described exemplary embodiments, the second sub-pixel electrode 161b surrounds the first sub-pixel electrode 161a, but the present invention is not limited thereto, which will be described through the sixth to seventh exemplary embodiments.

Figure 13:
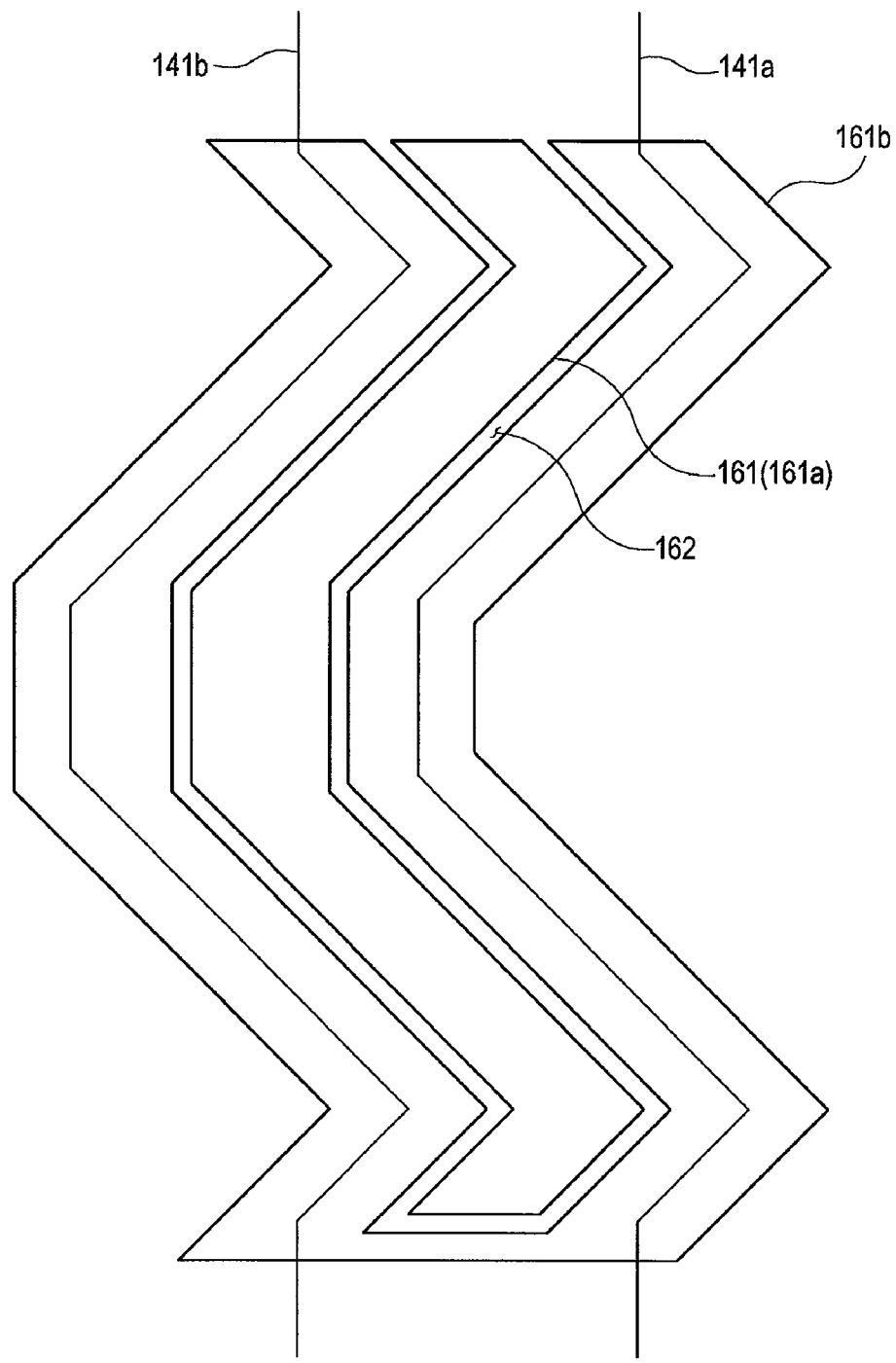
FIG. 13 is an arrangement plan view showing a liquid crystal display device according to a sixth exemplary embodiment of the present invention.

Referring to FIG. 13, a liquid crystal display device according to a sixth exemplary embodiment of the present invention will be described below.

A pixel electrode 161 is extended lengthwise along the direction of a data line 141, and is bent three times.

A first sub-pixel electrode 161a is also extended lengthwise along the direction of the data line 141, and is bent three times, too. A second sub-pixel electrode 161b is formed around the first sub-pixel electrode 161a, but is not formed on the upper portion of the first sub-pixel electrode 161a.

The data line 141 passes through the second sub-pixel electrode 161b to which a low data voltage is applied.

In an alternative exemplary embodiment, the second sub-pixel electrode 161b may not be formed on the lower portion of the first sub-pixel electrode 161a. In this case, a part of the second sub-pixel electrode 161b is formed on the upper portion of the first sub-pixel electrode 161a.

Figure 14:
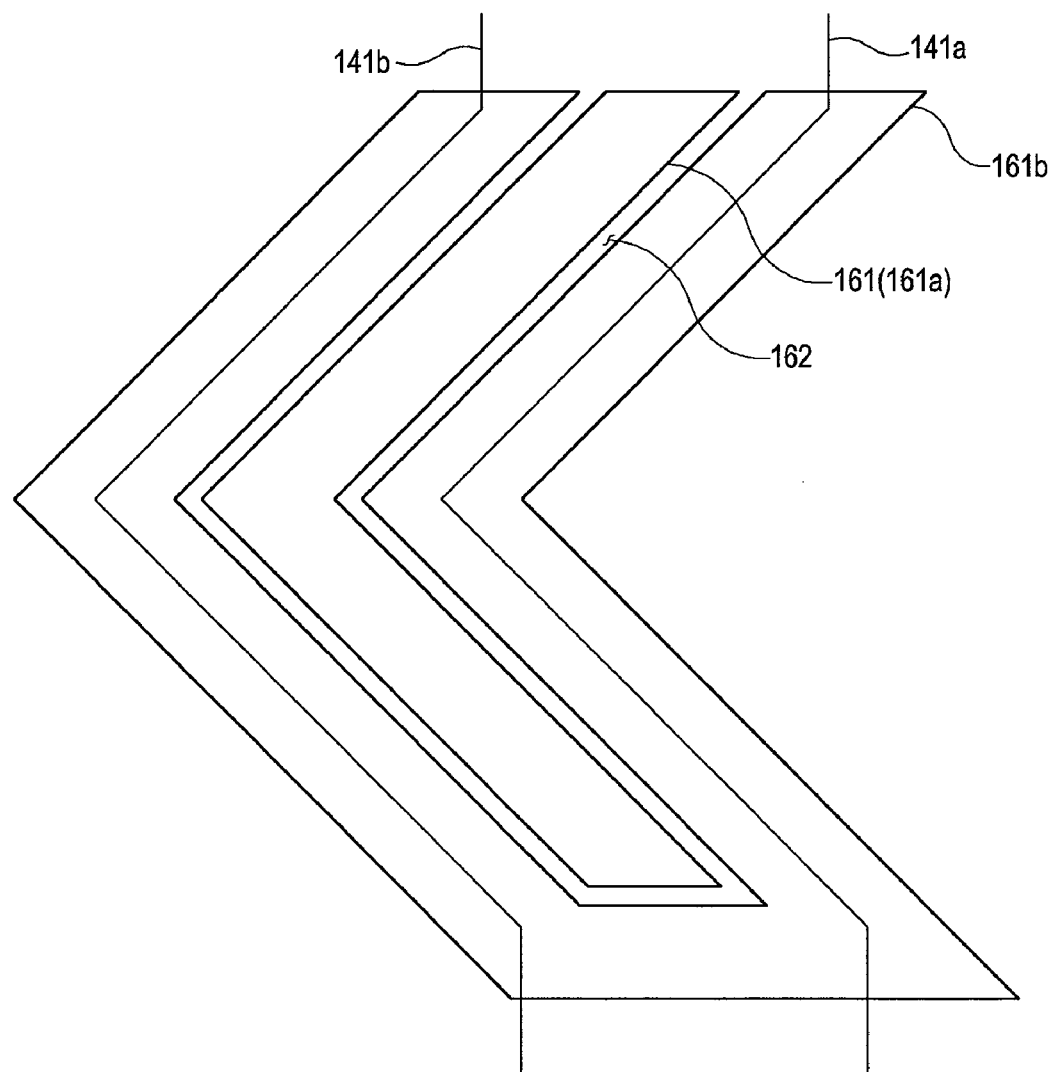
FIG. 14 is an arrangement plan view showing a liquid crystal display device according to a seventh exemplary embodiment of the present invention.

Referring to FIG. 14, a liquid crystal display device according to a seventh exemplary embodiment of the present invention will be described below.

A pixel electrode 161 is extended lengthwise along the direction of a data line 141, and is formed in a crooked shape that is bent once.

A first sub-pixel electrode 161a is also extended lengthwise along the direction of the data line 141, and is also formed in a crooked shape that is bent once. A second sub-pixel electrode 161b is formed around the first sub-pixel electrode 161a, but is not formed on the upper portion of the first sub-pixel electrode 161a.

The data line 141 passes through the second sub-pixel electrode 161b to which a low data voltage is applied.

In an alternative exemplary embodiment, the second sub-pixel electrode 161b may not be formed on the lower portion of the first sub-pixel electrode 161a. In this case, a part of the second sub-pixel electrode 161b is formed on the upper portion of the first sub-pixel electrode 161a.

The pixel electrode excision pattern is not shown in FIGS. 11 through 14.

Although several embodiments of the present invention have been shown and described, it will be appreciated by those skilled in the art that changes may be made in these embodiments without departing from the principles and spirit of the invention, the scope of which is defined in the appended claims and their equivalents.

As described above, the present invention provides a liquid crystal display device whose aperture ratio is improved.

What is claimed is:

1. A liquid crystal display device comprising:
   a first substrate having a data line and a gate line which cross each other; and
   a plurality of pixel electrodes each of which is bent at least once and that includes a first sub-pixel electrode extending along the direction of the data line, each pixel electrode also including a second sub-pixel electrode having a first part located on the right side of the first sub-pixel electrode and a second part located on the left side of the first sub-pixel electrode, the first sub-pixel electrode and the second sub-pixel electrode being separated from each other;
   the data line alternately passing through first and second ones of the sub-pixel electrodes.

2. The liquid crystal display device according to claim 1, wherein the first substrate further comprises a thin film transistor which is electrically connected with the pixel electrode, the thin film transistor including
   a first thin film transistor electrically connected with one of a first data line and a second data line and the first sub-pixel electrode; and
   a second thin film transistor which is electrically connected with the other of the first data line and the second data line and the second sub-pixel electrode.

3. The liquid crystal display device according to claim 1, wherein the data voltage applied to the first sub-pixel electrode is higher than the data voltage applied to the second sub-pixel electrode.

4. The liquid crystal display device according to claim 1, wherein the liquid crystal display device is driven at a frequency of 120 Hz.

5. The liquid crystal display device according to claim 1, wherein the data line and the first sub-pixel electrode are spaced from each other.

6. The liquid crystal display device according to claim 1, wherein the data line is bent along an edge of the pixel electrode.

7. The liquid crystal display device according to claim 1, wherein the first substrate further comprises an organic film located between the data line and the pixel electrode.

8. The liquid crystal display device according to claim 1, wherein the second sub-pixel electrode surrounds the first sub-pixel electrode.

9. The liquid crystal display device according to claim 1, wherein the first sub-pixel electrode has a crooked shape and the second sub-pixel electrode further includes a third part formed on the upper part of the first sub-pixel electrode; and a fourth part formed on the upper part of the first sub-pixel electrode.

10. The liquid crystal display device according to claim 1, wherein the pixel electrode is bent three times along the direction of the data line.

11. The liquid crystal display device according to claim 1, wherein the first sub-pixel electrode and the pixel electrode are bent three times along the direction of the data line.

12. The liquid crystal display device according to claim 1, wherein the first sub-pixel electrode and the pixel electrode each have a crooked shape.

13. The liquid crystal display device according to claim 1, further comprising a second substrate which faces the first substrate and comprises a common electrode; and a liquid crystal layer located between the first and second substrate, wherein a pixel electrode excision pattern is formed on the pixel electrode, a domain division part is formed in the common electrode, and the liquid crystal layer is formed in a vertical alignment mode.

14. The liquid crystal display device according to claim 1, further comprising a second substrate which faces the first substrate and comprises a common electrode; and a liquid crystal layer located between the first and second substrate, wherein a part of a domain division part in the common electrode is extended to overlap the data line.

15. A liquid crystal display device comprising;
an insulation substrate;
a data line and a gate line which are formed on the insulation substrate and cross each other;
a passivation film formed on the data line and the gate line; and
a pixel electrode formed on the passivation film includes first sub-pixel electrode and a second sub-pixel electrode which are separated from each other and are electrically connected with different data lines, the pixel electrode being bent at least once along the direction of the data line, and the second sub-pixel electrode overlaps the data line.

16. The liquid crystal display device according to claim 15, wherein the data voltage applied to the first sub-pixel electrode is higher than the data voltage applied to the second sub-pixel electrode.

17. The liquid crystal display device according to claim 15, wherein the data line is bent along an edge of the pixel electrode.

18. The liquid crystal display device according to claim 15, wherein the first substrate further comprises an organic film located between the data line and the pixel electrode.

19. The liquid crystal display device according to claim 15, wherein the second sub-pixel electrode surrounds the first sub-pixel electrode.

20. The liquid crystal display device according to claim 15, wherein the liquid crystal display device is driven at a frequency of 120 Hz.

21. The liquid crystal display device according to claim 15, wherein the first sub-pixel electrode has a crooked shape.

22. The liquid crystal display device according to claim 19, wherein the pixel electrode is bent three times along the direction of the data line.

23. The liquid crystal display device according to claim 15, wherein the data line comprises:
a first data line electrically connected with the first sub-pixel electrode; and
a second data line electrically connected with the second sub-pixel electrode,
the first sub-pixel electrode being located between the first data line and the second data line.

* * * * *